(12) United States Patent
Kaga et al.

(10) Patent No.: US 7,621,834 B2
(45) Date of Patent: Nov. 24, 2009

(54) BICYCLE TRANSMISSION APPARATUS INCLUDING A ONE-WAY CLUTCH AND A SLIDE MECHANISM, AND BICYCLE INCORPORATING SAME

(75) Inventors: Hiroyuki Kaga, Saitama (JP); Tatsuro Kimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 718 days.

(21) Appl. No.: 11/236,682

(22) Filed: Sep. 27, 2005

(65) Prior Publication Data
US 2006/0068954 A1 Mar. 30, 2006

(30) Foreign Application Priority Data
Sep. 29, 2004 (JP) .............................. 2004-285493

(51) Int. Cl.
*F16H 61/00* (2006.01)
*F16D 41/24* (2006.01)
(52) U.S. Cl. .............................. 474/78; 474/69; 474/74; 192/64
(58) Field of Classification Search .................... 474/69
See application file for complete search history.

(56) References Cited
U.S. PATENT DOCUMENTS 1,743,492 A * 1/1930 Sipe .......................... 403/297
3,658,369 A * 4/1972 Barnes ....................... 403/316
5,271,486 A * 12/1993 Okamoto et al. ............. 192/45
5,515,957 A * 5/1996 McConaghy ................ 192/64
2002/0166712 A1* 11/2002 Ishimaru et al. ............ 180/337
2004/0130120 A1* 7/2004 Matsumoto et al. ......... 280/260

FOREIGN PATENT DOCUMENTS

JP 2004-155280 6/2004

* cited by examiner

*Primary Examiner*—Bradley T King
*Assistant Examiner*—Robert T Reese
(74) *Attorney, Agent, or Firm*—Carrier, Blackman & Associates, P.C.; William D. Blackman; Joseph P. Carrier

(57) ABSTRACT

A transmission mechanism obtains reduced cost by facilitating a process for guide grooves formed on an inner cylinder of a ball spline mechanism and regulates a movement of a drive sprocket in an axial direction by means of a simple structure. A one-way clutch transmits torque only when a crankshaft rotates positively to a drive sprocket through a ball spline mechanism. A clutch outer body and an inner slide member of the ball spline mechanism are composed of members separate from and coupled to each other by coupling pins to be integrally rotatable in an overlapping portions in an axial direction. Guide grooves for housing balls of the ball spline mechanism are formed on the inner slide member while opening to the axial direction at both ends thereof in the axial direction. The overlapping portion of the clutch is overlapping on the guide grooves in the axial direction, and restricts an outer slide member of the ball spline mechanism from moving in the axial direction beyond a predetermined range of movement with respect to the inner slide member of the ball spline mechanism.

20 Claims, 8 Drawing Sheets

BICYCLE TRANSMISSION APPARATUS INCLUDING A ONE-WAY CLUTCH AND A SLIDE MECHANISM, AND BICYCLE INCORPORATING SAME

CROSS-REFERENCE TO RELATED APPLICATIONS

The present invention claims priority under 35 USC 119 based on Japanese patent application No. 2004-285493, filed on Sep. 29, 2004. The subject matter of this priority document is incorporated by reference herein.

BACKGROUND OF THE INVENTION

1. Field of the Invention

The present invention relates to a gear-shifting transmission apparatus for a bicycle, and to a bicycle incorporating the apparatus. More particularly, the invention relates to a transmission mechanism of the type using a one-way clutch and slide mechanism.

2. Background Art

In a bicycle disclosed in Japanese Patent Publication No. 2004-155280, a transmission is provided in which a transmission position can be switched to multiple speeds by a derailleur. In the transmission, a drive sprocket coupled in a driven manner to a crankshaft with a one-way clutch interposed therebetween moves in an axial direction in response to a movement of a chain in the axial direction when the chain is shifted between plural transmission sprockets. Therefore, in a torque transmission path between the one-way clutch and the drive sprocket, a slide mechanism is provided, which, when the crankshaft rotates positively, transmits torque of the crankshaft through the one-way clutch to the drive sprocket, thereby rotating the drive sprocket integrally with the crankshaft, and making the drive sprocket movable with respect to the crankshaft in the axial direction. The slide mechanism is composed of a ball spline mechanism including plural balls arranged between an inner cylinder and an outer cylinder and housed in housing grooves formed on the inner cylinder and the outer cylinder. Moreover, in the inner cylinder formed of one member, molded integrally therewith are a stopper for regulating a movement of the balls in the axial direction in the housing grooves, thereby regulating movement ranges of the drive sprocket and the outer cylinder in the axial direction, and a clutch outer body of the one-way clutch. Furthermore, the stopper is located between the housing grooves and the clutch outer body to the axial direction.

In the conventional technology described above, the stopper and the clutch outer body are integrally molded in the inner cylinder of the ball spline mechanism. Accordingly, the housing grooves are formed into a dead-end shape formed in a range from one end of the inner cylinder to a halfway thereof in the axial direction, and the housing grooves cannot be formed by means of machining capable of performing a grooving process at low cost, for example, broaching. Therefore, cost caused by the machining is increased, and eventually, cost of the transmission is increased. Moreover, the stopper is subjected to the integral molding, and a restriction thus also occurs in machining for an inner peripheral surface of the clutch outer body, with which clutch elements are to be engaged, thus also resulting in an increase of the processing cost.

SUMMARY OF THE INVENTION

The present invention has been created in consideration of the circumstances as described above. It is an object of the present invention to provide a transmission mechanism capable of reducing costs by facilitating a process for guide grooves formed on an inner slide member of a slide mechanism, and in addition, regulating a movement of a second rotation member in an axial direction by means of a simple structure. It is also an object of the present invention to further perform, in a slide mechanism including a coupling element, regulation of a movement of the second rotation member in the axial direction and prevent the coupling element from falling off by means of a simple structure. It is an also an object of the invention to further facilitate in a clutch outer body of a one-way clutch having an overlapping portion with the slide mechanism, a process for an engagement portion with which a clutch element is engaged, thereby achieving the reduction of the cost. It is an object of the invention to further provide a coupling pin for coupling the clutch outer body of the one-way clutch and the inner slide member of the slide mechanism to each other and prevent the coupling pin from falling off by means of a simple structure. It is an object of the invention to maintain performance of integral rotation of the clutch outer body and the inner slide member coupled to each other by the coupling pin for a long period of time, and enhance workability in coupling the clutch outer body and the inner slide member to each other.

The invention according to a first aspect is a transmission mechanism including a first rotation member such as a crankshaft, coupled to a one-way clutch, the one way clutch having a clutch outer body coupled to an clutch inner body, the clutch inner body being integrally rotatable with the first rotation member. A clutch element is interposed between the clutch inner body and the clutch outer body. A slide mechanism coupled to the clutch has an outer slide member coupled to an inner slide member so as to be integrally rotatable with the inner slide member and movable in an axial direction with respect to the inner slide member which is integrally rotatable with the clutch outer body, whereby the one-way clutch only transmits torque when the first rotation member rotates positively to a second rotation member such as a drive sprocket, through the slide mechanism. A guide groove is provided for guiding the slide mechanism outer slide member to be movable in the axial direction, the guide groove being formed parallel to an axial direction on an outer peripheral surface of the inner slide member, the guide groove being formed to open to the axial direction at both ends in the axial direction. The clutch outer body and the slide mechanism inner slide member are composed of members separate from each other, with the clutch outer body having a clutch-side overlapping portion and the inner slide member having a slide-side overlapping portion. The clutch-side overlapping portion and the slide-side overlapping portion are overlapping on each other in the axial direction, the clutch outer body and the inner slide member are coupled to each other to be integrally rotatable with each other in the clutch-side overlapping portion and the slide-side overlapping portion. The clutch-side overlapping portion is overlapping on the guide groove in the axial direction, and restricts the outer slide member from moving in the axial direction beyond a predetermined range of movement, with respect to the inner slide member.

Accordingly, the guide groove for guiding the second rotation member together with the outer slide member so as to be movable in the axial direction is formed parallel to the axial direction on the outer peripheral surface of the inner slide member so that both ends thereof in the axial direction can open to the axial direction. Thus, in comparison with a known guide groove having a dead end halfway through without an opening to the axial direction, it becomes easy to form the guide groove by means of machining. Thus, a choice of options for processing means for the groove is widened, and it is made possible to process the guide groove by lower-cost processing means. Moreover, the movements of the outer slide member and the second rotation member in the axial direction beyond a predetermined range of movement are regulated in such a manner that a part of the clutch-side overlapping portion, which is also a part of the clutch outer body, having the inner slide member coupled thereto, is disposed so as to be overlapping on the guide groove in the axial direction.

In a second aspect of the invention, the transmission mechanism according to the above, the slide mechanism includes a coupling element for coupling the inner slide member and the outer slide member to each other to be integrally rotatable with the inner slide member and movable in the axial direction with respect to the inner slide member, the coupling element is disposed between the inner slide member and the outer slide member, housed in the guide groove, and guided to be movable in the axial direction, and the clutch-side overlapping portion abuts on the coupling element, and regulates a movement of the coupling element in the axial direction, thereby restricting the outer slide member from moving in the axial direction beyond the movement range.

According to this embodiment, in the slide mechanism including the coupling element housed in the guide groove, by the clutch-side overlapping portion abutting on the coupling element, the movements of the outer slide member and the second rotation member in the axial direction beyond the predetermined range of movement are regulated, and the coupling element is prevented from falling off from the guide groove.

In a third aspect of the invention the transmission mechanism according to any of the above embodiments has a clutch outer body having a main body portion in which an engagement portion having the clutch element engaged therewith is formed, a maximum inner diameter of the main body portion is equal to or less than a minimum inner diameter of the clutch-side overlapping portion, and the engagement portion is formed by forming, on the inner peripheral surface, a groove extended parallel to the axial direction and having both ends thereof in the axial direction open to the axial direction.

According to this embodiment, the engagement portion is formed by forming, on the inner peripheral surface of the main body portion, the groove extended parallel to the axial direction and having both ends thereof open to the axial direction. Accordingly, in comparison with a case of forming the engagement portion by the groove having the dead end halfway without opening to the axial direction, it becomes easy to form the engagement portion by means of the machining, the choice of options for the processing means for the engagement portion is widened, and it is made possible to process the engagement portion by the lower-cost processing means.

In a fourth aspect of the invention the transmission mechanism according to any of the above embodiments has the clutch-side overlapping portion and the slide-side overlapping portion disposed inside in a diameter direction from the clutch-side overlapping portion are coupled to each other by a coupling pin, the coupling pin has a clutch-side insertion portion inserted into a clutch-side insertion space formed in the clutch-side overlapping portion, and a slide-side insertion portion inserted into a slide-side insertion space formed in the slide-side overlapping portion, and in a portion closer to the slide-side insertion portion than to the clutch-side insertion portion in the coupling pin, a step portion incapable of being inserted into the clutch-side insertion space is formed.

According to this embodiment, the clutch outer body and the inner slide member are coupled to each other by the coupling pin having the clutch-side insertion portion and the slide-side insertion portion, which are inserted into the clutch-side insertion space and the slide-side insertion space, respectively, the insertion spaces being formed in the respective overlapping portions of the clutch outer body and the inner slide member. Accordingly, a coupling structure here is simple. Moreover, the step portion is formed in the coupling pin. Accordingly, when centrifugal force generated by rotations of the clutch outer body and the inner slide member is applied to the coupling pin, the step portion abuts on the clutch-side overlapping portion, and the coupling pin is thus prevented from moving outside in the diameter direction.

In a fifth aspect of the invention the transmission mechanism according to any of the above embodiments has the clutch-side overlapping portion and the slide-side overlapping portion disposed inside in a diameter direction from the clutch-side overlapping portion are coupled to each other by a coupling pin, the coupling pin has a slide-side insertion portion inserted into a slide-side insertion space formed in the slide-side overlapping portion, the slide-side insertion space is composed of a slit formed on an end of the slide-side overlapping portion in the axial direction and opening to the axial direction, the coupling pin has a pair of pin-side contact planes individually brought into surface contact with a pair of slide-side contact planes opposed to each other in a circumferential direction in a wall surface defining the slit, and the coupling pin is inserted into the slit from the axial direction.

According to this embodiment, transmission between the coupling pin and the inner slide member is performed on the portions where the contact planes thereof are brought into surface contact with each other. Accordingly, a contact pressure of each contact portion of both of the contact planes is reduced, and in addition, the surface contact is made by the planes. In such a way, the coupling pin is prevented from rotating. Therefore, a relative rotation of the coupling pin to the inner slide member and the clutch outer body is prevented, abrasion owing to the relative rotation is prevented, and a gap owing to the abrasion is prevented or restricted from being formed between the coupling pin and the inner cylinder and the clutch outer body. Moreover, the coupling pin is inserted into the inner slide member from the axial direction, and accordingly, coupling work for the clutch outer body and the inner slide member to each other by the coupling pin is facilitated.

According to the first aspect of the invention, it is possible to process the guide groove of the inner slide member by the lower-cost processing means, and accordingly, processing cost of the inner slide member is reduced, and thus, the cost of the transmission mechanism is reduced. Moreover, the movement of the second rotation member in the axial direction beyond the predetermined range of movement is regulated by the clutch-side overlapping portion. Accordingly, the movement of the second rotation member in the axial direction can be regulated by means of a simple structure utilizing the clutch-side overlapping portion for the guide groove in which both ends open.

According to the second aspect of the invention, in the slide mechanism including the coupling element, the regulation of the movement of the second rotation member in the axial direction and the prevention of the coupling element from falling off can be achieved by means of a simple structure utilizing the clutch-side overlapping portion.

According to the third aspect of the invention, in the clutch outer body of the one-way clutch having the clutch-side overlapping portion coupled to the inner slide member of the slide mechanism, it becomes easy to process the engagement portion with which the clutch element is engaged. Therefore, processing cost of the clutch outer body is reduced, and eventually, the cost of the transmission mechanism is reduced.

According to the fourth aspect of the invention, the clutch outer body and the inner slide member are coupled to each other by means of a simple coupling pin, and the coupling pin is prevented from falling off from the inner slide member and the clutch outer body by the rotations of the clutch outer body and the inner slide member.

According to the fifth aspect of the invention, a gap owing to abrasion is prevented or restricted from being formed between the coupling pin and the inner slide member and the clutch outer body. Accordingly, performance of integral rotation of the clutch outer body and the inner slide member can be maintained for a long period of time, and in addition, workability in the coupling work for the clutch outer body and the inner slide member to each other is enhanced.

DETAILED DESCRIPTION OF THE INVENTION

Figure 1:
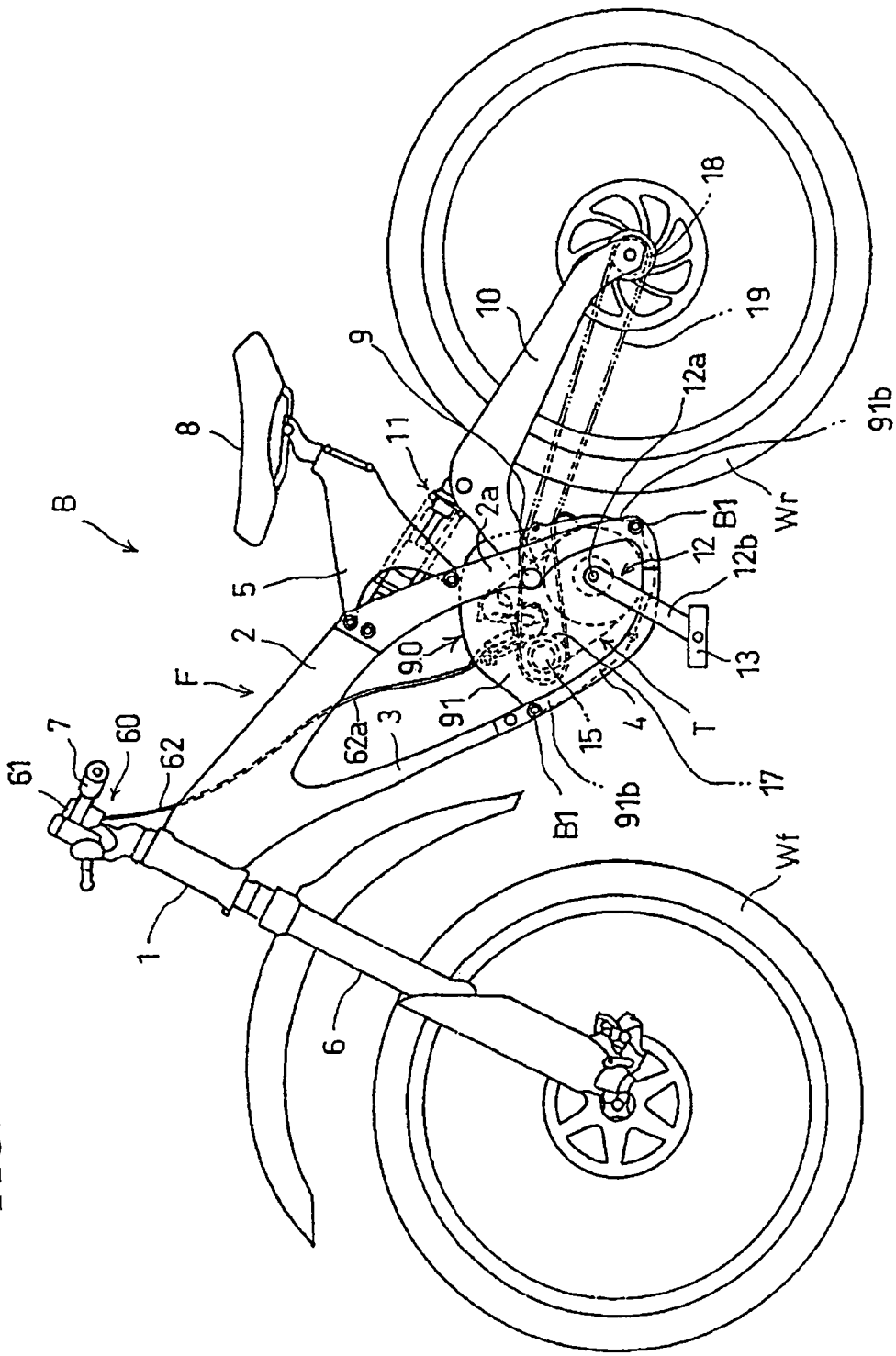
FIG. 1 is a schematic left side view of a bicycle, including a transmission to which the present invention is applied, showing an illustrative embodiment of the present invention.

Referring to FIG. 1, a bicycle B, including a transmission T to which the present invention is applied, is shown in side plan view. The bicycle B includes a body frame F, and a drive device having a pedal-type crankshaft 12, the transmission T, an output shaft 15, rotationally driven by power that has been shifted, and a drive power transmission mechanism.

The body frame F includes a head pipe 1, for steerably supporting a front fork 6 that pivotally supports a front wheel Wf at a lower end thereof. The front fork 6 also has a handlebar 7 fixedly attached to an upper end thereof. The body frame F also includes a pair of left-and-right main frames 2 extend diagonally downwardly from the head pipe I toward the rear of the bicycle B, and a pair of down tubes 3 extend diagonally downward and toward the rear from front ends of both main frames 2. The body frame F also includes a pair of left-and-right under tubes 4 for coupling rear ends of the main frames 2 and the down tubes 3 together. The body frame F also includes a saddle frame 5 at a central upper portion thereof, extended from the respective main frames 2 and provided for supporting a seat 8.

Note that, in the specification and the claims, the axial direction, a diameter direction and a circumferential direction stand for a direction along a rotational centerline of a first rotation member or the crankshaft 12, a diameter direction along a main drive sprocket with the rotational centerline taken as a center, and a circumferential direction around the main drive sprocket with the rotational centerline taken as a center, respectively. A side view stands for a view from the axial direction. Moreover, the terms upper and lower, front and rear and left and right, respectively, coincide with upper and lower, front and rear and left and right of the bicycle B or similar transport apparatus which is provided with the transmission hereof, considered from the vantage point of an operator seated on the bicycle and facing forward.

Figure 3:
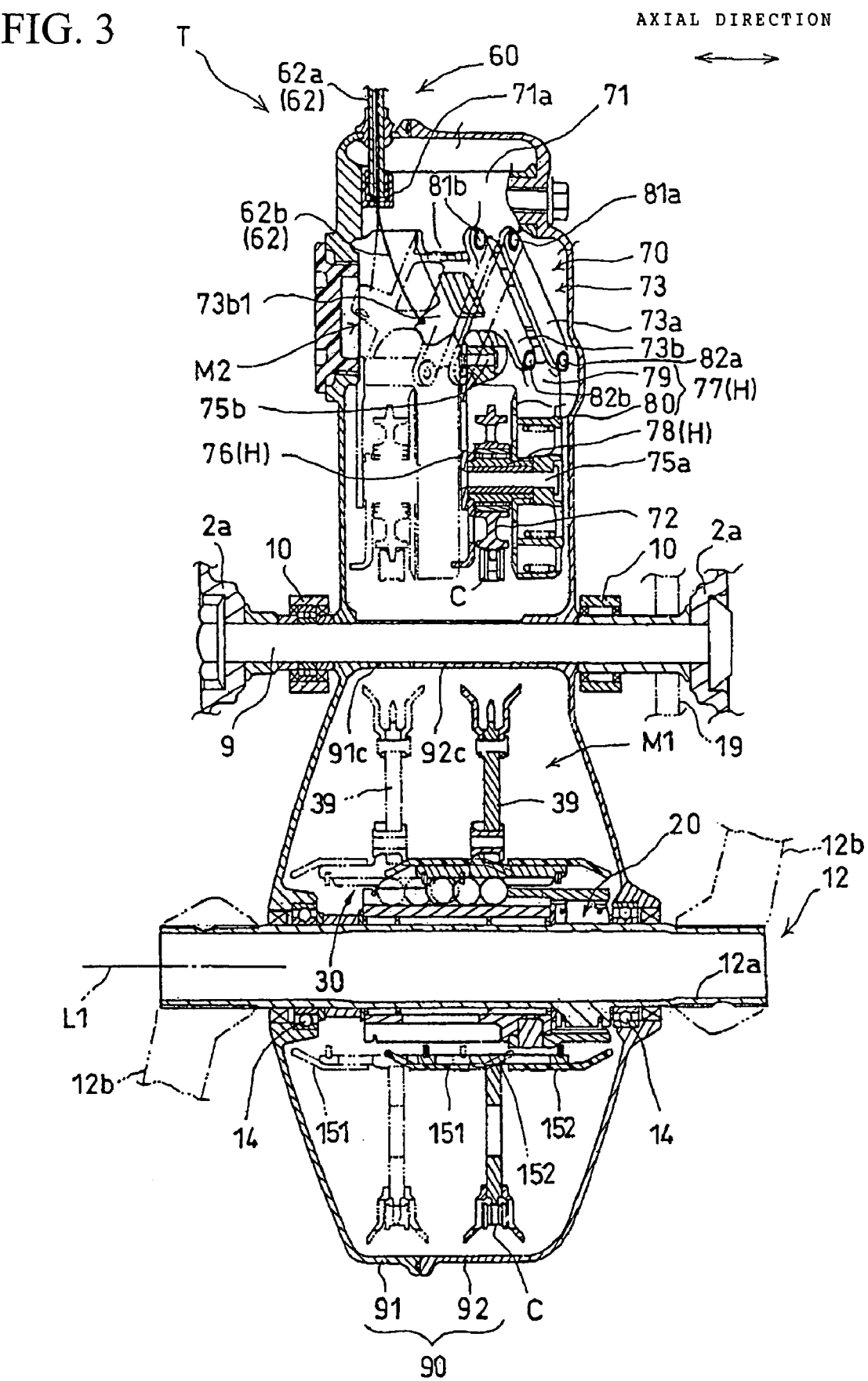
FIG. 3 is a cross-sectional view along a line III-III of FIG. 2, partially showing a cross section of a derailleur.

As shown in FIG. 1 and also referring to FIG. 3, a pivot shaft 9 is provided extending through rear portions 2a of both main frames 2, and this pivot shaft is also extends through and pivotally supports the respective front ends of a pair of left-and-right swing arms 10, provided for rotatably supporting a rear wheel Wr thereon, with an axle shaft of the rear wheel attached onto rear ends of the swing arms 10. The swing arms 10 are coupled to the respective adjacent main frames 2, with shock absorber providing a rear suspension 11 interposed between the swing arms and the main frames 2, as shown. Thereby, the two swing arms 10, along with the attached rear wheel Wr, can pivotally reciprocate and swing up and down about the pivot axle 9.

A transmission T is provided attached to the body frame F, and is located in a space formed at a lower portion of the body frame between the rear portions 2a of both main frames 2 and both under tubes 4. The transmission T includes a transmission case 90, a transmission shift mechanism M1, a derailleur 70, a crankshaft 12 and an output shaft 15, which are rotatably supported by the transmission case 90. In the depicted embodiment of the invention, the above-described drive power transmission mechanism is disposed on the right side of the body frame F.

Figure 2:
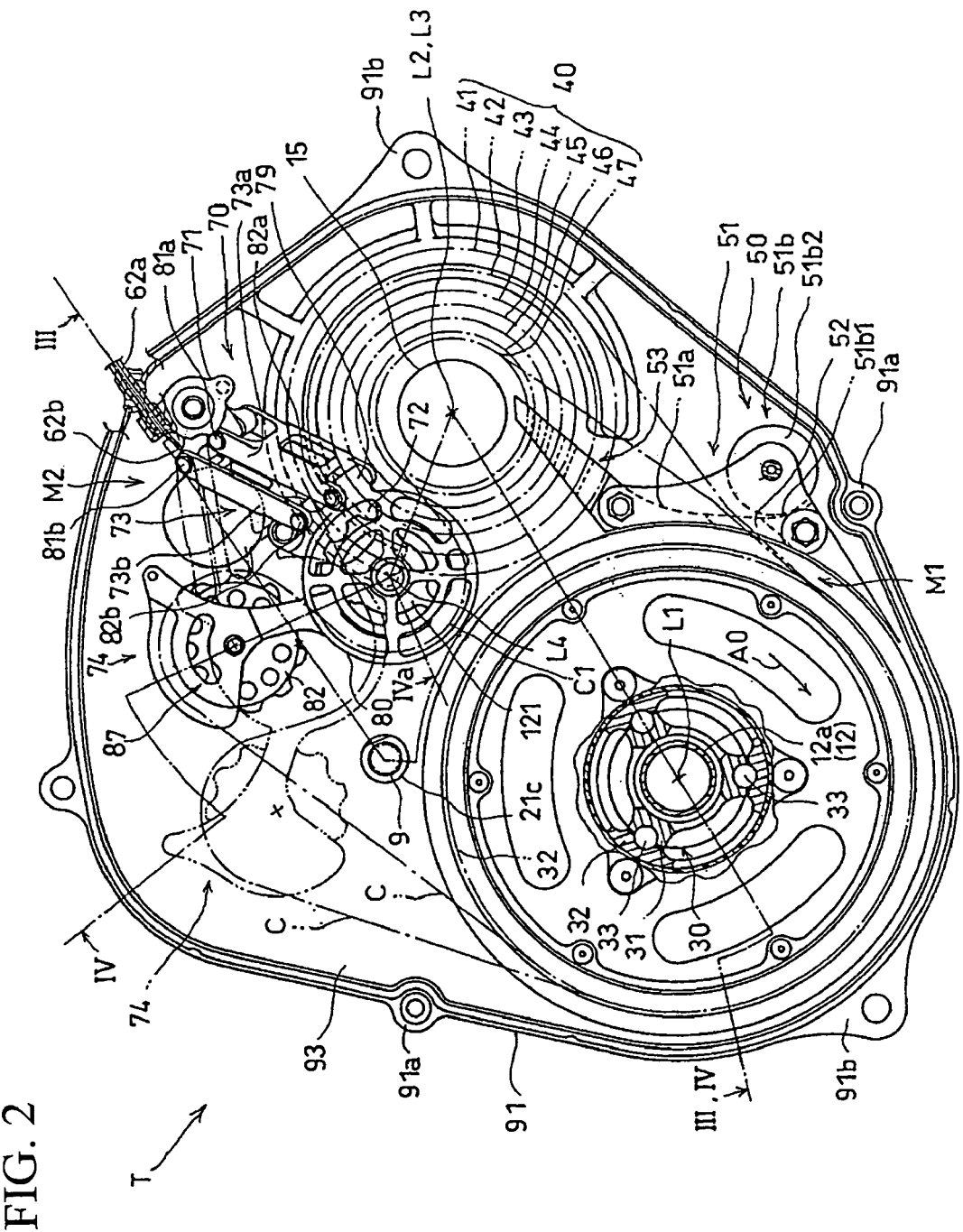
FIG. 2 is a view of the transmission of FIG. 1 in a state where a second case is detached therefrom, shown by an arrow II of FIG. 4 and partially shown by a cross section along a line II-II of FIG. 5.

Referring also to FIG. 2 in combination with FIGS. 1 and 3, the transmission T includes a metal transmission case 90 that includes a first case shell 91, as a left case of a left-and-right pair, and a second case shell 92 which is removably fastened to the first case shell as a right case. A number of connection bosses 91a of the first case shell 91 are shown formed in a peripheral edge portion thereof, in FIG. 2, and corresponding connection bosses are formed in the second case shell 92. The connection bosses of the first and second case shells are coupled to each other by a respective bolt (not shown) for each pair of bosses. The first and second case shells 91, 92 cooperate to define an inside space 93 therebetween, as a hermetically sealed or substantially hermetically sealed space. The transmission case 90 is fixed individually to both main frames 2 and both under tubes 4 by bolts B1 on a pair of attachment portions (an attachment portion 91b of the first case shell 91 is shown in FIG. 1 and FIG. 2) formed on peripheral edges of the first and second cases 91 and 92.

Figure 4:
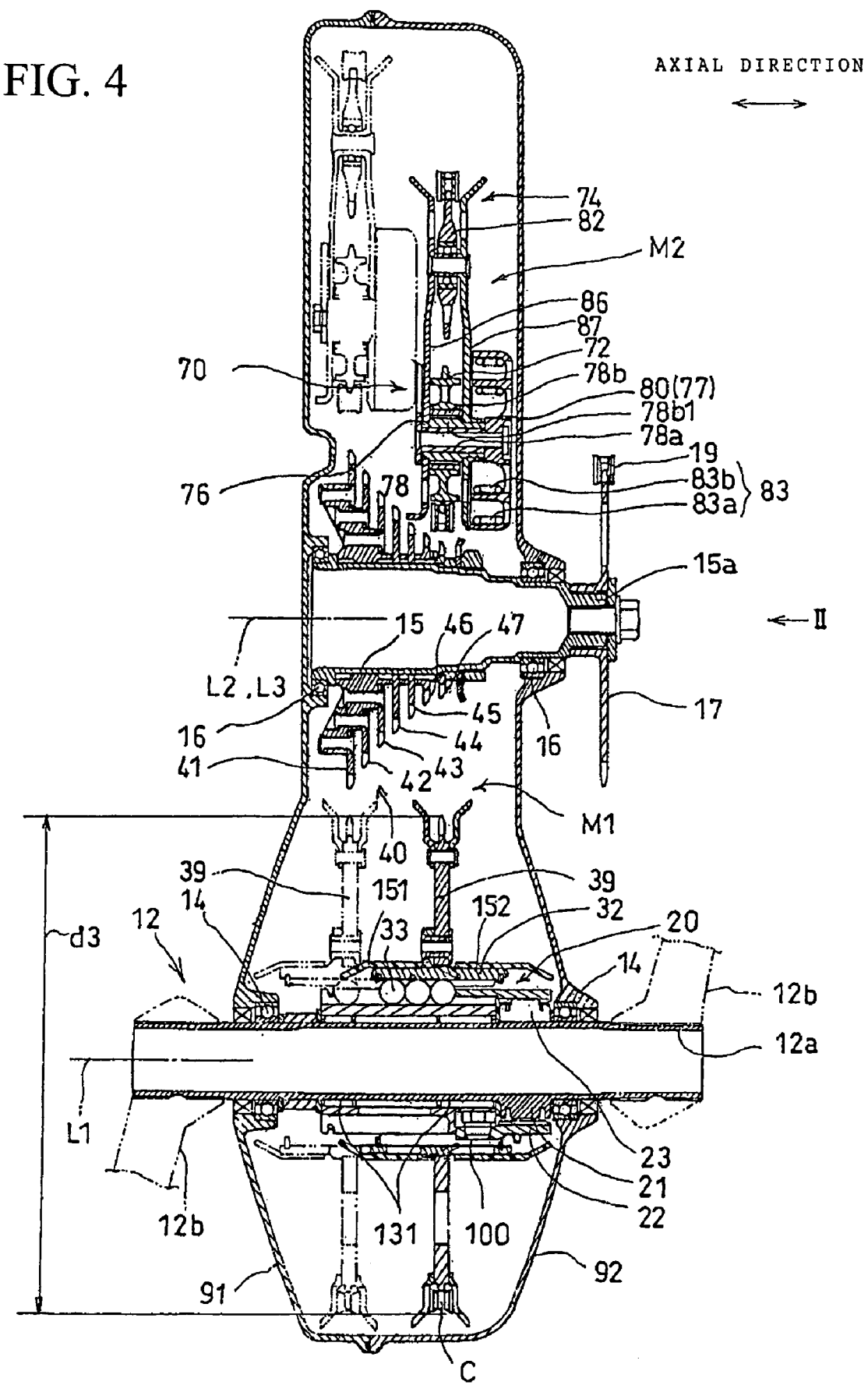
FIG. 4 is a cross-sectional view along a line IV-IV of FIG. 2, partially showing a cross section of the derailleur along a line IVa.

Referring also to FIG. 3 and FIG. 4, the crankshaft 12 acts as an input shaft that is rotationally driven by a rider and receives drive torque, and includes a main shaft 12a disposed so as to penetrate a lower portion of the transmission case 90 in the left-and-right direction, and a pair of crank arms 12b individually coupled to both left-and-right ends of the main shaft 12a and which protrude outside of the transmission case 90. The main shaft 12a is rotatably supported on the first and second cases 91 and 92 with a pair of bearings 14 interposed therebetween. Pedals 13 (FIG. 1) are rotatably attached onto the respective crank arms 12b.

The output shaft 15 and the pivot shaft 9 are disposed diagonally above in front of the main shaft 12a and substantially immediately above the main shaft 12a, respectively, so that a rotational centerline L2 of the output shaft 15 and a swing centerline of the swing arm 10 can be parallel to each other and to a rotational centerline L1 of the crankshaft 12 and can remain within a rotational orbit of the crank arms 12b. The pivot shaft 9 fixed to the main frames 2 is inserted through holes of bosses 91c and 92c formed in the first and second cases 91 and 92 so as to protrude to the inside space 93, and support the first and second cases 91 and 92.

Referring also to FIG. 4, the output shaft 15 housed in the transmission case 90 has an end 15a protruding from the second case shell 92 to the right side. An output drive sprocket 17 acts as an output drive rotator and is coupled to the end 15a. Referring also to FIG. 1, an output chain 19 acts as an outputting endless drive belt that is flexible and is wound between the drive sprocket 17 and an outputting driven sprocket 18 as an outputting driven rotator coupled in a driven manner to the rear wheel Wr. The drive sprocket 17, the chain 19 and the driven sprocket 18 constitute the above-described drive power transmission mechanism for driving the rear wheel Wr as a drive wheel.

Referring especially to FIG. 2 through FIG. 4, the transmission T includes a chain-type transmission mechanism M1, a transmission switching mechanism M2 for switching the transmission mechanism M1 to a desired shift position in response to a shift operation, and the transmission case 90 which houses the derailleur 70 to be described later, which is a constituent element of the transmission mechanism M1 and the transmission switching mechanism M2.

The transmission mechanism M1 includes the one-way clutch 20, a ball spline mechanism 30 as a slide mechanism, a drive sprocket 39, plural transmission sprockets 41 to 47 as driven sprockets, an endless transmission chain C, and a chain guide member 50. The drive sprocket 39 is disposed coaxially with the main shaft 12a of the crankshaft 12, and coupled in a driven manner to the crankshaft 12 with the one-way clutch 20 and the ball spline mechanism 30 interposed therebetween.

Figure 5:
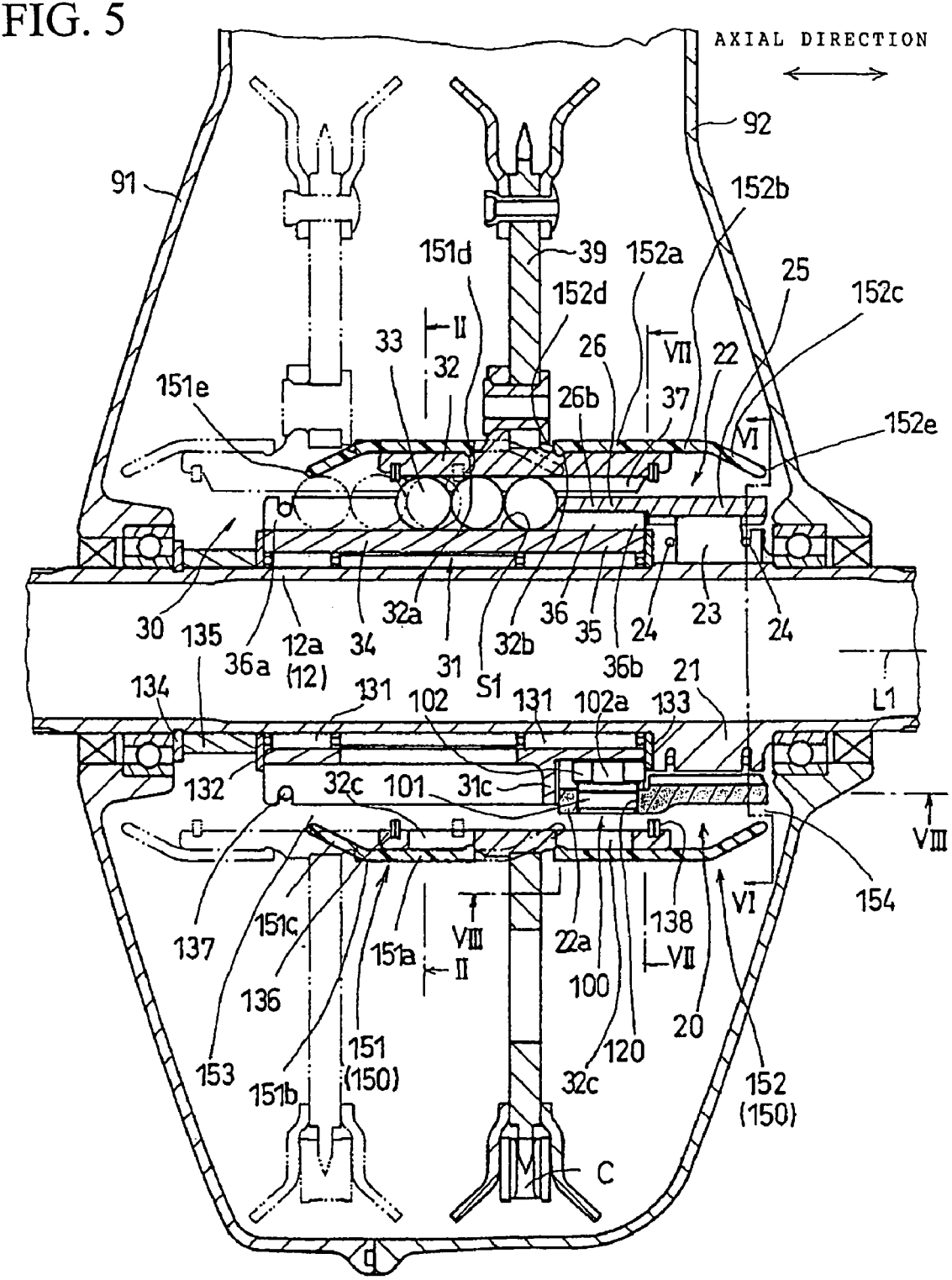
FIG. 5 is an enlarged view of main portions of FIG. 3.
Figure 6:
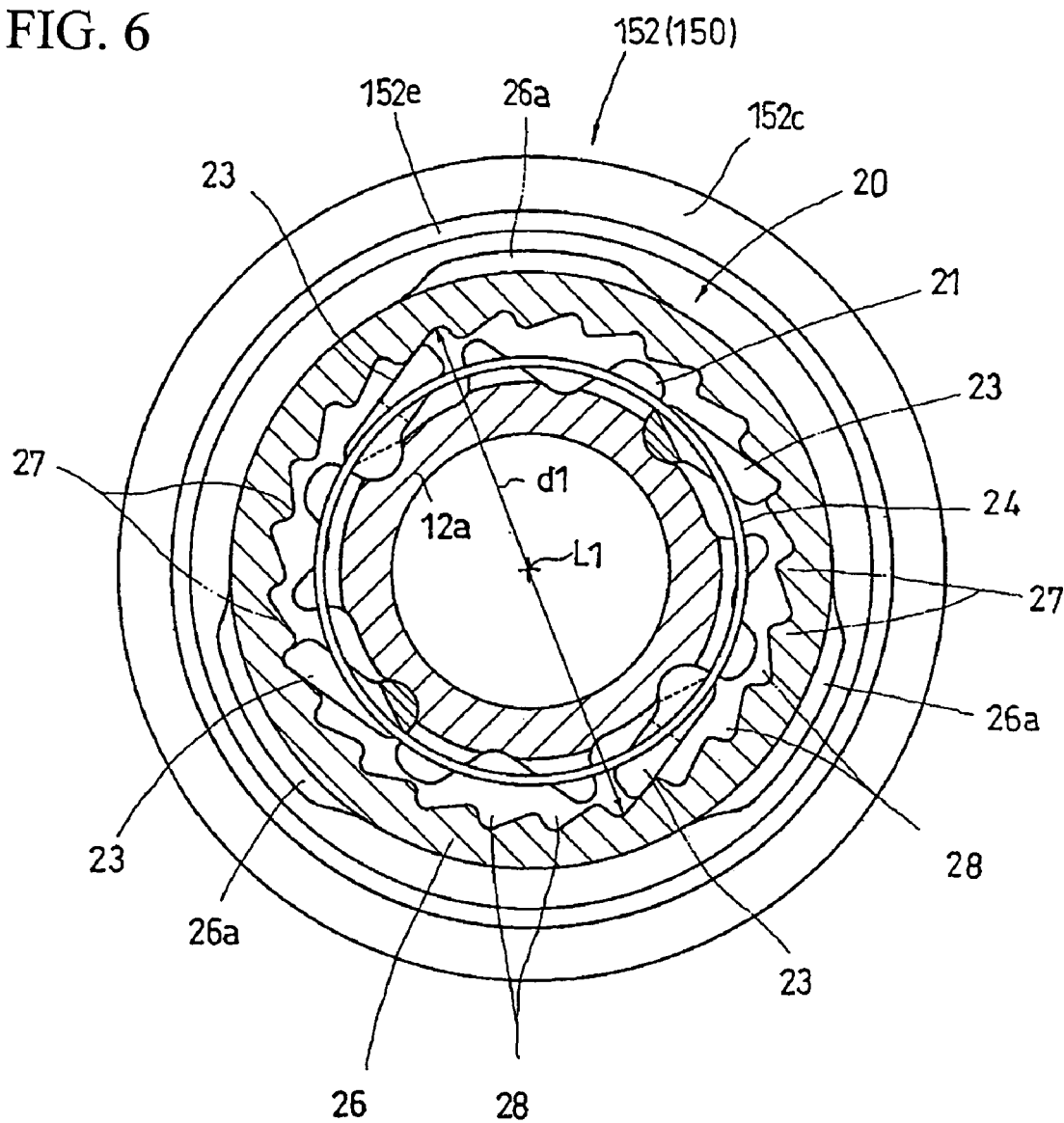
FIG. 6 is a cross-sectional view along a line VI-VI of FIG. 5.
Figure 7:
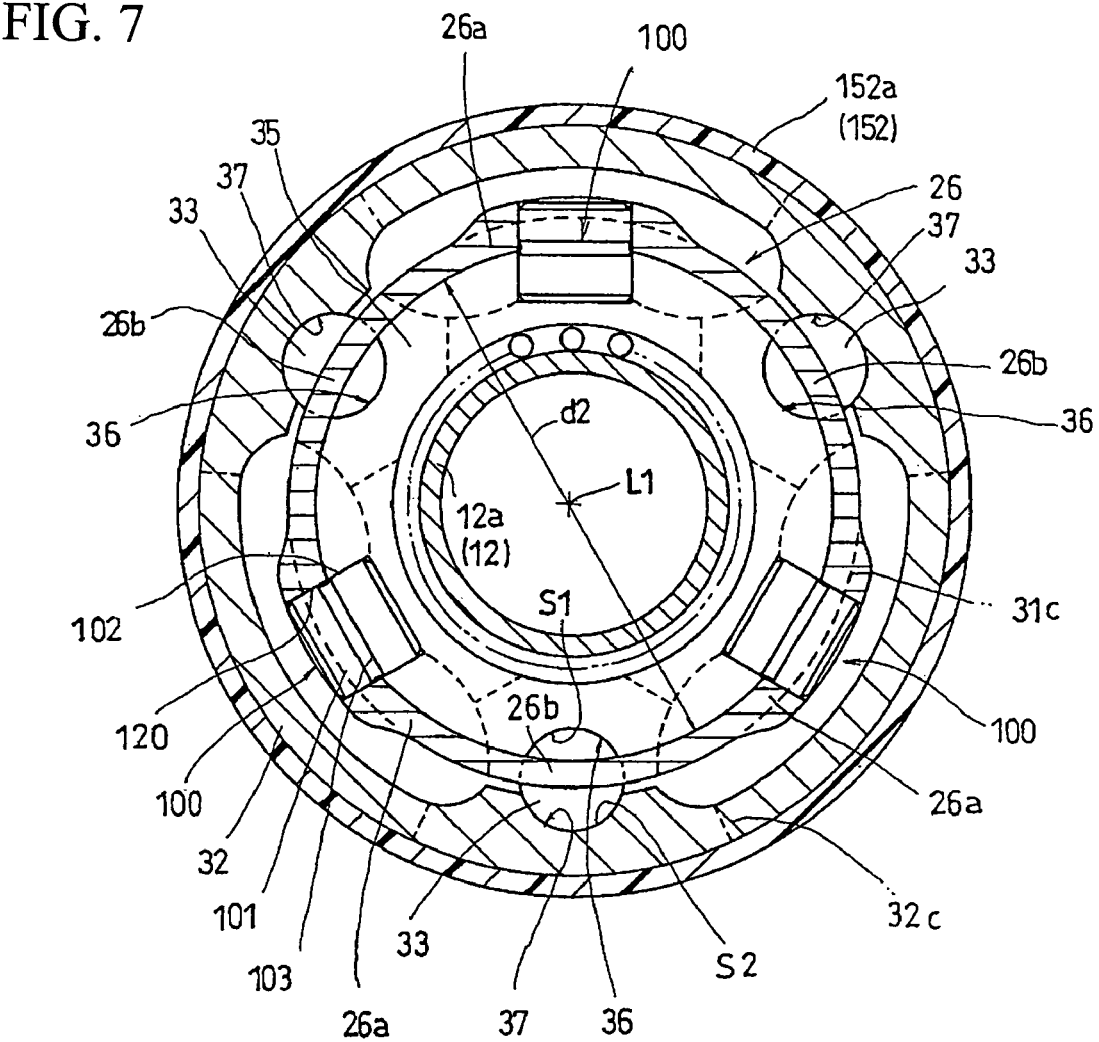
FIG. 7 is a cross-sectional view along a line VII-VII of FIG. 5.
Figure 8:
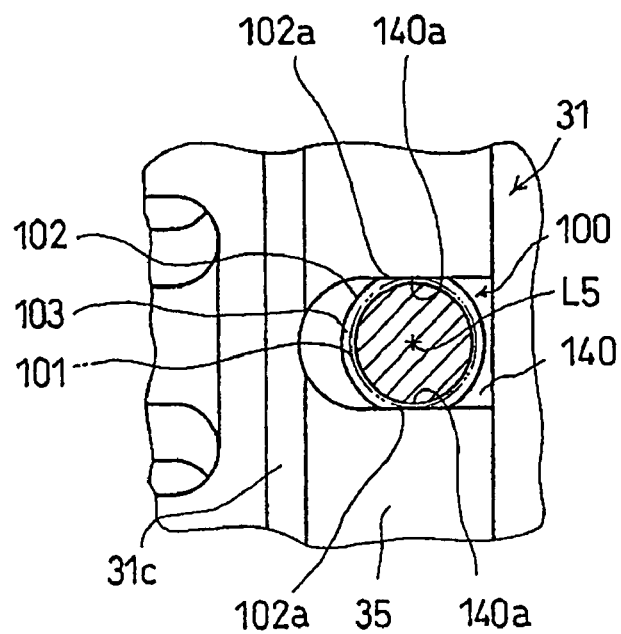
FIG. 8 is a cross-sectional view along a line VIII-VIII of FIG. 5.

Referring also to FIG. 5 to FIG. 7, the one-way clutch 20 includes a clutch inner body 21 integrally rotatable with the crankshaft 12, a cylindrical clutch outer body 22 disposed outside of the clutch inner body 21 in the diameter direction, plural claws 23 as clutch elements arranged between the clutch inner body 21 and the clutch outer body 22, and a ring-like spring 24 as an elastic member for imparting spring force to the claws 23 so that the respective claws 23 can be brought into contact with plural ratchet teeth 27 serving as engagement portions of the clutch outer body 22.

Only when the crankshaft 12, as the first rotation member, rotates in a positive rotation direction A0, the clutch outer body 22 is coupled to the clutch inner body 21 with the claws 23 interposed therebetween, and rotates integrally with the clutch inner body 21. Therefore, the one-way clutch 20 only transmits the rotation or torque through the ball spline mechanism 30 to the drive sprocket 39, as a second rotation member, when the crankshaft 12 is rotating positively.

The clutch inner body 21 is molded integrally with the main shaft 12a, and supports the respective claws 23 so as to be swingable. The clutch outer body 22 is one cylindrical member having a cylindrical main body portion 25 having an inner peripheral surface on which the plural sawtooth-like ratchet teeth 27 are formed for having the respective claws 23 engaged therewith. The clutch outer body 22 further has a cylindrical clutch-side overlapping portion 26 continuing adjacent to the main body portion 25 in the axial direction and overlapping on the ball spline mechanism 30 in the axial direction. The main body portion 25 and the overlapping portion 26 are molded integrally with each other.

The maximum inner diameter d1 (FIG. 6) of the main body portion 25 is equal to or less than the minimum inner diameter d2 (FIG. 7) of the overlapping portion 26, and the respective ratchet teeth 27 are located inside, in the diameter direction, from an inner peripheral surface of the overlapping portion 26. Moreover, the plural ratchet teeth 27 are formed in such a manner that plural grooves 28 extended parallel to the axial direction on an inner peripheral surface of the main body portion 25 and having both ends thereof in the axial direction open to the axial direction are formed. More specifically, each groove 28 between the ratchet teeth 27 adjacent to each other in the circumferential direction is formed substantially across the overall width in the axial direction of the inner peripheral surface of the main body portion 25 by processing the inner peripheral surface of the main body portion 25 by means of machining, preferably, broaching, and the plural ratchet teeth 27 are thus formed. Hence, the maximum inner diameter of the main body portion 25 of the clutch outer body 22 before the ratchet teeth 27 are formed thereon, that is, before the machining such as the broaching is performed therefor is equal to or less than the minimum inner diameter d2.

The ball spline mechanism 30, disposed together with the one-way clutch 20 in a torque transmission path between the crankshaft 12 and the drive sprocket 39, includes a cylindrical inner slide member 31 integrally rotatable with the clutch outer body 22. The ball spline mechanism 30 includes a cylindrical outer slide member 32 disposed outside, in the diameter direction, from the inner slide member 31 and moving integrally with the drive sprocket 39. Plural balls 33, act as coupling elements arranged between the inner slide member 31 and the outer slide member 32 in the diameter direction, and couple the inner slide member 31 and the outer slide member 32 so that the outer slide member 32 can be integrally rotatable with the inner slide member 31 and movable in the axial direction with respect thereto.

Referring again to FIG. 2, the inner slide member 31 is a cylinder composed of a member separate from the clutch outer body 22 and is rotatably supported on an outer periphery of the main shaft 12a with a bearing 131 interposed therebetween. The inner slide member 31 is coupled to the clutch outer body 22 so as to be rotatable integrally therewith by coupling pins 100 as further described below. The inner slide member 31 is a member having a main body portion 34 for supporting the balls 33 so as to be movable in the axial direction, and a slide-side overlapping portion 35 continuing adjacent to the main body portion 34 in the axial direction and overlapping on the overlapping portion 26 in the axial direction, in which the main body portion 34 and the overlapping portion 35 are molded integrally with each other.

The inner slide member 31 is supported on the main shaft 12a so as to be immovable in the axial direction by annular rings 132 and 133 as a pair of thrust bearings attached onto the main shaft 12a immovably in the axial direction so as to abut on both ends thereof in the axial direction. One of the annular rings, which is denoted by reference numeral 132, abuts on a collar 135 abutting on a snap ring 134 fitted to an annular ring provided on the main shaft 12a, and the other ring 133 abuts on the clutch inner body 21. In such a way, movements of the rings 132 and 133 in the axial direction are regulated. Moreover, the drive sprocket 39 is coupled to the outer slide member 32 integrally therewith by rivets.

On an outer peripheral surface of the inner slide member 31, plural guide grooves 36, three in this embodiment, are formed for housing and supporting the balls 33 so as to be capable of rolling and guiding the balls so as to be immovable in the circumferential direction and to be movable in the axial direction. The guide grooves 36 are formed at an equal intervals in the circumferential direction and so as to be extended parallel in the axial direction substantially across the overall width of the inner slide member 31 in the axial direction of the outer peripheral surface. Moreover, on an inner peripheral surface of the outer slide member 32, the same number of guide grooves 37 as that of the guide grooves 36 are formed at an interval in the circumferential direction so as to be opposed to the respective guide grooves 36 in the diameter direction and to be extended parallel to the axial direction. As in the guide grooves 36, the respective guide grooves 37 support and house the balls 33 so as to be immovable in the circumferential direction and to be movable in the axial direction. In a pair of the guide grooves 36 and 37 composed of the guide groove 36 of the inner slide member 31 and the guide groove 37 of the outer slide member 32, both of the guide grooves being opposed to each other in the diameter direction, a row of the plural balls 33 is housed astride both guide grooves 36 and 37.

Moreover, the respective guide grooves 36 and 37 open to the axial direction on both ends 36a and 36b thereof. The respective guide grooves 36 and the respective guide grooves 37 are formed by individually processing the outer peripheral surface of the inner slide member 31 and the inner peripheral surface of the outer slide member 32 by means of the machining, preferably, the broaching. Therefore, in the inner slide member 31, the guide grooves 36 and guide surfaces S1 and S2 to be described later are formed across the main body portion 34 and the overlapping portion 35.

Figure 9:
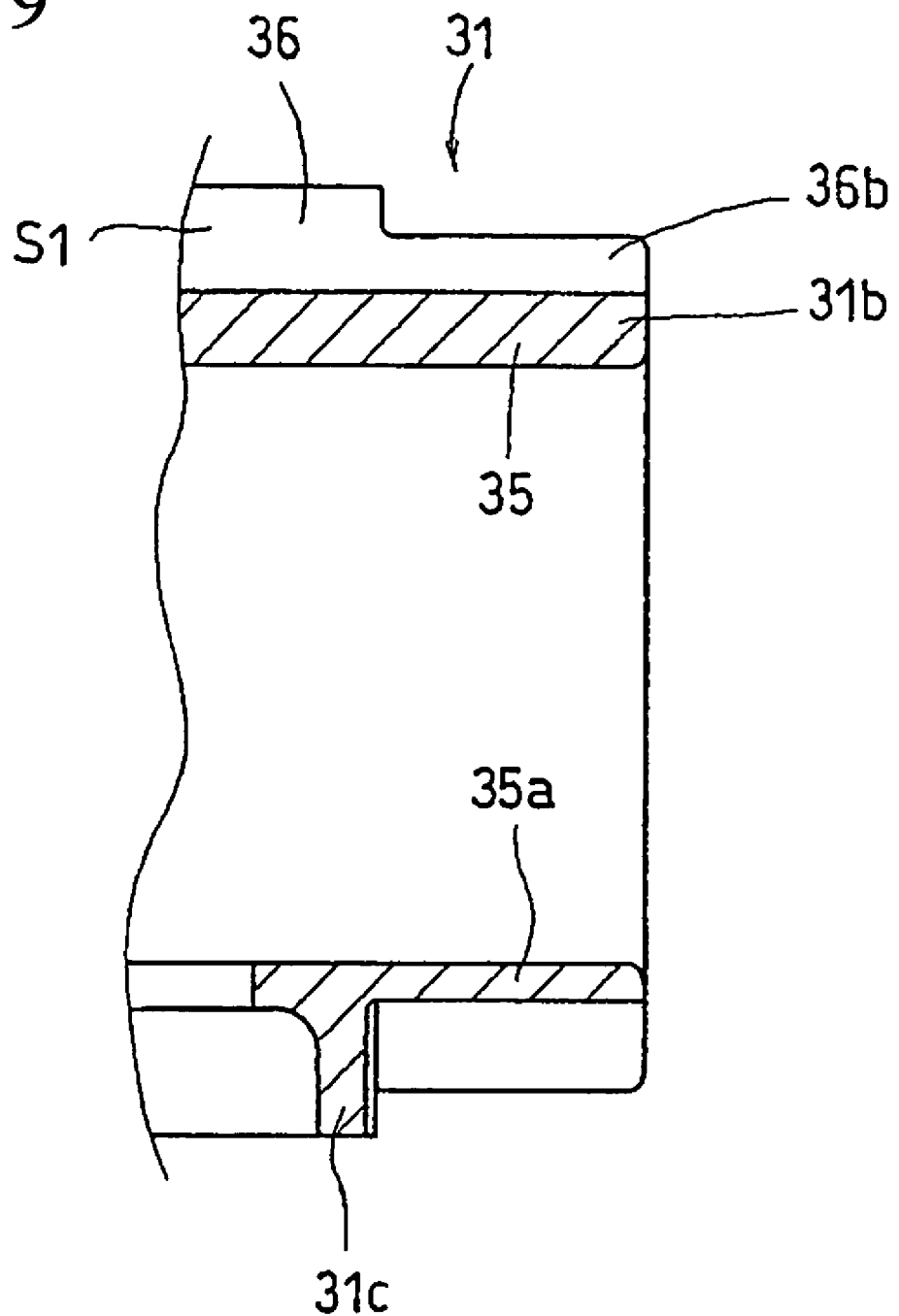
FIG. 9 is a cross-sectional view of main portions of an inner cylinder of a ball spline mechanism along the line III-III of FIG. 2.

Each wall surface of the respective guide grooves 36 and 37 is composed of a part of a cylindrical surface, and the wall surfaces constitute the guide surfaces S1 and S2 (FIG. 9 and FIG. 7) for guiding the balls 33 so as to be movable parallel to the axial direction while rolling the balls 33. Therefore, the guide grooves 36 and 37 with the guide surfaces S1 and S2 guide the balls 33 parallel to the axial direction, thereby guiding the outer slide member 32 and the drive sprocket 39 so as to be movable parallel to the axial direction.

In order to restrict the outer slide member 32 and the drive sprocket 39 from moving in the axial direction beyond a predetermined range of movement in the axial direction with respect to the inner slide member 31, the one-way clutch 20 and the crankshaft 12, a pair of inner-side stopper portions 26b (FIG. 7) and 137 and a pair of outer-side stopper portions 136 and 138 for restricting the balls 33 from moving in the axial direction beyond the predetermined range of movement are provided in the ball spline mechanism 30. Here, the above-described predetermined range of movement, hereinafter, simply referred to as a "movement range," is a range where the drive sprocket 39 moves in the axial direction correspondingly to a guide pulley 72 and the chain C which move within a swing range of the derailleur to be described below.

More specifically, movements of the outer slide member 32 and the drive sprocket 39 to the right side beyond the movement range are regulated by each stopper portion 26b composed of a part of the overlapping portion 26 of the clutch outer body 22 and the stopper portion 136 composed of the snap ring attached onto the outer slide member 32. Moreover, movements of the outer slide member 32 and the drive sprocket 39 to the left side beyond the movement range are regulated by the stopper portion 137 composed of the snap ring attached onto the inner slide member 31 and the stopper portion 138 composed of the snap ring attached onto the outer slide member 32. Hence, in the inner slide member 31, the respective balls 33 are movable in the axial direction in portions of the guide grooves 36 or the guide surfaces S1, which belong to the main body portion 34.

Referring to FIG. 5 and FIG. 7 to FIG. 9, the clutch outer body 22 and the inner slide member 31 are coupled to each other by the coupling pins 100 as coupling members so as to be integrally rotatable in the clutch-side overlapping portion 26 and the slide-side overlapping portion 35. The clutch-side overlapping portion 26 includes a left end 22a of the clutch outer body 22, and the slide-side overlapping portion 35 includes a right end 31b of the inner slide member 31.

The clutch-side overlapping portion 26 is disposed between the slide-side overlapping portion 35 located inside in the diameter direction and the outer slide member 32 located outside therein, and disposed so as to be overlapping on the guide groove 36 with the guide surface S1 in the axial direction. More specifically, the clutch-side overlapping portion 26 has coupling portions 26a in which the coupling pins 100 are provided, and the stopper portion 26b opposed to the respective guide grooves 36 or the guide surfaces S1 in the diameter direction. The coupling portions 26a in which insertion holes 120, further described below, are formed also serve as positioning portions abutting on abutting portions 31c molded integrally with the main body portion 34 of the inner slide member 31 and located in the guide grooves 36 adjacent thereto in the circumferential direction. Specifically, the coupling portions 26a are located between the stopper portions 26b adjacent thereto in the circumferential direction, and abut on the abutting portions 31c, thereby determining positions of the stopper portion 26c in the axial direction with respect to the inner slide member 31, and eventually, determining a position of the clutch outer body 22 in the axial direction. The stopper portions 26b are disposed so as to be overlapping on portions of the guide grooves 36 or the guide surfaces S1, which belong to the slide-side overlapping portion 35, and cover the outside of the portions concerned in the diameter direction. Moreover, the stopper portions 26b abut on the balls 33 in the guide grooves 36 to regulate the movement of the balls in the axial direction, thereby restricting the outer slide member 32 and the drive sprocket 39 from moving in the axial direction beyond the movement range, and preventing the balls 33 from falling off from the guide grooves 36.

Referring again to FIG. 7 and FIG. 8, each coupling pin 100 has a clutch-side insertion portion 101 inserted into the insertion hole 120 formed of a circular hole as a clutch-side insertion space formed in the coupling portion 26a, and a slide-side insertion portion 102 inserted into a slit 140 as a slide-side insertion space formed in the overlapping portion 35. The coupling pin 100 is a columnar pin having different diameter portions in which an outer diameter in the axial direction of the coupling pin 100 differs. The clutch-side insertion portion 101 is composed of a small-diameter portion, and the slide-side insertion portion 102 is composed of a large-diameter portion larger in diameter than the clutch-side insertion portion 101 and the insertion hole 120. Moreover, in the coupling pin 100, in a portion closer to the slide-side insertion portion 102 than to the clutch-side insertion portion 101, a step portion 103 incapable of being inserted into the insertion hole 120 is formed by the slide-side insertion portion 102 itself. The slide-side insertion portion 102 has contact planes 102a as a pair of pin-side contact surfaces opposed to each other in the diameter direction while sandwiching an axial line of the coupling pin 100 therebetween. Both contact planes 102a define a plane including an axial line L5 as a symmetry plane and are planes parallel to each other.

The slit 140 as a bottom-provided groove having a bottom wall 35a is formed on an end of the overlapping portion 35 in the axial direction and opens to the axial direction. The slit 140 has contact planes 140a as a pair of slide-side contact surfaces opposed to each other in the circumferential direction in a wall surface defining the slit 140. A distance between both contact planes 140a parallel to each other is equal to an outer diameter of the insertion portion 101 and a distance between both contact planes 102a. Note that the distance between both contact planes 102a may be larger than the outer diameter of the clutch-side insertion portion 101. Moreover, the pair of contact planes 102a is brought into surface contact with the pair of contact planes 140a in a state where the insertion portion 102 is inserted into the slit 140.

Moreover, the clutch outer body 22 and the slide mechanism inner slide member 31 are coupled to each other by the coupling pins 100 in such a manner as described below.

First, the clutch-side insertion portion 101 is inserted into the insertion hole 120 having a diameter approximately equal to the outer diameter of the clutch-side insertion portion 101, and the coupling pin 100 is positioned so that the respective contact planes 102a can be parallel to the axial direction, and is held on the clutch outer body 22. Thereafter, the coupling pin 100, integrated with the clutch outer body 22, is inserted into the slit 140 from the axial direction while bringing the contact planes 102a of the coupling pin 100 and the contact planes 140a of the inner slide member 31 in contact with each other. Moreover, in a state where the one-way clutch 20 and the ball spline mechanism 30 are attached onto the main shaft 12a, and the clutch outer body 22, the inner slide member 31 and the outer slide member 32 are arranged coaxially with the main shaft 12a, the coupling pin 100 is prevented from falling off from the slit 140 in the axial direction by the ring 133 (FIG. 5) abutting on the right end thereof.

Therefore, with respect to the crankshaft 12 and the inner slide member 31 immovable in the axial direction, the outer slide member 32 and the drive sprocket 39 are integrally rotatable therewith with the balls 33 interposed therebetween, and are movable in the axial direction. Moreover, the crankshaft 12, the one-way clutch 20, the ball spline mechanism 30 and the drive sprocket 39 constitute a transmission mechanism for transmitting, to the drive sprocket 39, torque applied when the rider works the pedals.

Referring to FIG. 2 and FIG. 5 to FIG. 7, in the outer slide member 32, there is provided a dust cover 150 for covering the outsides in the diameter direction of the guide surfaces S1 and S2 of the guide grooves 36 and 37, which open toward the diameter direction, irrespective of the positions of the outer slide member 32 and the drive sprocket 39 in the axial direction. In projected portions 151b and 152b further projected and extended individually in the axial direction from both ends of the outer slide member 32 in the axial direction, the dust cover 150 has a pair of tapered portions 151c and 152c tapered toward ends 151e and 152e of the projected portions 151b and 152b in the axial direction. An interval between both ends 151e and 152e in the axial direction, that is, a covered range of the guide grooves 36 and 37 with the guide surfaces S1 and S2 is set by providing the dust cover 150 so that when the drive sprocket 39 moves in the movement range, the dust cover 150 can always cover the substantial entirety of a movement range of the balls 33 on the guide surfaces S1 and S2 in cooperation with the outer slide member 32. Moreover, open areas of the respective openings 153 and 154 of the dust cover 150, which are defined by the respective ends 151e and 152e, are made smaller by providing the tapered portions 151c and 152c than in the case where the tapered portions 151c and 152c are not provided.

The dust cover 150 is composed of a pair of first and second cover portions 151 and 152 arranged on an outer periphery of the outer slide member 32 while sandwiching the drive sprocket 39 therebetween in the axial direction. The respective cover portions 151 and 152, as members separate from the outer slide member 32, are formed into a holeless tube shape covering the overall periphery of the inner slide member 31, and here, into a cylindrical shape, and have base portions 151a and 152a brought into contact with the outer peripheral surface of the outer slide member 32 and covering the outer slide member 32, and the projected portions continuous with the base portions 151a and 152a.

The respective cover portions 151 and 152 are formed of synthetic resin, and held on the outer slide member 32 by holding means. The holding means is composed of convex portions 151d and 152d as cover-side engagement portions formed on inner peripheral surfaces as inner surfaces of the base portions 151a and 152a of the respective cover portions 151 and 152, and concave portions 32a and 32b as outer-side engagement portions formed on an outer peripheral surface as the outer surface of the outer slide member 32. The convex portions 151d and 152d are composed of annular protrusions extended in the circumferential direction and formed on ends on the base portions 151a and 152a side in ends of the respective covers 151 and 152 in the axial direction. The concave portions 32a and 32b are composed of grooves extended in the circumferential direction and formed on positions where the entirety of the opening 32c formed in order to reduce weight of the outer slide member 32 is covered with the first cover 151 or the second cover 152. Moreover, the convex portions 151d and 152d are engaged with the concave portions 32a and 32b, and the respective cover portions 151 and 152 are attached onto the outer slide member 32. Furthermore, the first and second covers 151 and 152 are located below the guide pulley 72 of the derailleur 70 to be described later.

Referring to FIG. 2 and FIG. 4, the output shaft 15 is rotatably supported on the transmission case 90 with a pair of bearings 16 held on both cases 91 and 92 interposed therebetween. A sprocket group 40; composed of plural, seven in this embodiment, transmission sprockets 41 to 47 different in outer diameter and number of teeth; is coupled by a spline so as to be integrally rotatable with the output shaft 15 and disposed coaxially therewith. As used herein, the outer diameter is the diameter of a circle defined by tooth tips of a sprocket. Therefore, a rotational centerline L3 of the respective transmission sprockets 41 to 47 coincide with the rotational centerline L2 of the output shaft 15, which is parallel to the rotational centerline L1 of the crankshaft L2. Moreover, the transmission sprockets 41 to 47 are arrayed in the axial direction so that speeds thereof can get sequentially higher toward the secondary transmission case 90 located on the right side from the transmission sprocket 41 for the first speed as the lowest speed to the transmission sprocket 47 for the seventh speed as the highest speed.

Referring to FIG. 3, the chain C is wound between the drive sprocket 39 and an operation sprocket as one of the transmission sprockets 41 to 47, which is selected from the sprocket group 40 by the transmission switching mechanism M2, hereinafter, such an operation sprocket is simply referred to as an "operation sprocket", and in FIG. 2 to FIG. 4, a state where the transmission sprocket 41 or the transmission sprocket 47 serving as the operation sprocket is shown. The output shaft 15 is rotationally driven by the crankshaft 12 in a gear ratio determined by the drive sprocket 39 and the operation sprocket coupled thereto in a driven manner with the chain C interposed therebetween.

Referring to FIG. 2, the chain guide member 50 is disposed on a tension side of the chain C driven by the crankshaft 12 rotating positively, and constitutes chain jamming prevention means for preventing the sagging chain C from being jammed between the drive sprocket 39 and the transmission case 90 when a sag owing to a decrease of the tension occurs on the tension side.

The chain guide member 50 includes a guide portion 51 forming an opening 52 having a width in the axial direction, which is somewhat larger than a width of the sprocket group 40 in the axial direction, and a regulation portion 53 for restricting the chain C rolled out from the respective transmission sprockets 41 to 47 from moving to the inside of an orbit of the chain. In order to guide the sagging chain C to the opening 52 in an aligned state, the guide portion 51 includes an inner guide portion 51a disposed close to the inside of the chain orbit with respect to the opening 52, and an outer guide portion 51b disposed close to the outside of the chain orbit with respect to the opening 52 and having an outer guide portion 51b1 and a roller 51b2.

Referring to FIG. 1 to FIG. 4, the transmission switching mechanism M2 includes a shift operation mechanism 60, and the derailleur 70 as a shift mechanism for shifting the chain C in the sprocket group 40 in response to the shift operation by the shift operation mechanism 60. The chain C is wound among the drive sprocket 39, the operation sprocket, and further, the guide pulley 72 and a tension pulley 82 which are to be described later, and both of which are disposed on a loosening side of the chain C driven by the crankshaft 12 rotating positively.

The shift operation mechanism 60 coupled to the derailleur 70 in the inside space 93 of the transmission case 90 includes a shift operation member 61 (FIG. 1) composed of a shift lever or the like operated by the rider, and includes an operation cable 62 as an operating force transmission member for operationally coupling the shift operation member 61 and the derailleur 70 to each other in order to transmit an action of the shift operation member 61. The operation cable 62 is composed of a tubular outer cable 62a held by the body frame F and the transmission case 90, and an inner cable 62b inserted into the inside of the outer cable 62a. One end of the inner cable 62b is coupled to the shift operation member 61, and the other end thereof is coupled to the derailleur 70.

Referring to FIG. 2 to FIG. 4, the derailleur 70 disposed above the main shaft 12a of the crankshaft 12 and shifting the chain C wound around the drive sprocket 39 between the transmission sprockets 41 to 47 by the operation of the operation cable 62 includes a cylindrical base portion 71 held in a state of being fixed by both cases 91 and 92 and having a holding portion 71a for the outer cable 62a provided thereon, a holder H for holding the guide pulley 72 so as to be rotatable, a parallel link mechanism 73 coupling the base portion 71 and the holder H to each other and having a pair of links 73a and 73b as a swing mechanism for moving the guide pulley 72 in the axial direction and the diameter direction of the rotational centerline L3 in response to the shift operation by the shift operation mechanism 60, and a tensioner 74 for imparting tension to the chain C.

The holder H is composed of first and second holders 76 and 77 and a support portion 78, which are coupled to one another by a pair of rivets 75a and 75b. The guide pulley 72 is rotatably supported by the first and second holders 76 and 77 with the support portion 78 interposed therebetween, the support portion 78 having a collar 78a fitted onto the rivet 75a and a bearing 78b rotatably supported on the collar 78a. To an inner portion 78b1 of the bearing 78b, a pair of first and second arms 86 and 87 to be described later are integrally coupled by press-fitting.

Referring to FIG. 2 and FIG. 4, the guide pulley 72 disposed above the ball spline mechanism 30 and the first and second covers 151 and 152 is disposed at a position where the shortest distance from the rotational centerline L1 of the crankshaft 12 to the guide pulley 72 is smaller than an outer diameter d3 (FIG. 4) of the drive sprocket 39. Specifically, in the entirety of the above-described swing range, the substantial entirety of the guide pulley 72, which includes at least a wound portion C1 of the chain C in the guide pulley 72, is located within a circle of which radius is the outer diameter d3 of the drive sprocket 39 with the rotational centerline L1 taken as a center.

Referring to also FIG. 3, the second holder 77 has a coupling portion 79 to which the pair of links 73a and 73b are fitted and coupled, and a spring housing portion 80 for housing a tension spring 83. In the parallel link mechanism 73, both links 73a and 73b are fitted to the base portion 71 with a pair of pins 81a and 81b provided parallel to each other on the base portion 71 interposed therebetween, and are fitted to a pair of pins 82a and 82b provided parallel to each other on the coupling portion of the second holder. Between the pin 81a and the pin 82b, a return spring formed of an extension coil spring (not shown) is wound.

The tensioner 74 includes the tension pulley 82 for imparting the tension to the chain C by pressing the chain C between the drive sprocket 39 and the guide pulley 72, with the first and second arms 86 and 87 supporting the tension pulley 82 so as to be rotatable and disposed between the first and second holders 76 and 77 in the axial direction while sandwiching the guide pulley 72 therebetween. The tension spring 83 composed of springs 83a and 83b formed of two twisted coil springs different from each other in diameter. The respective springs 83a and 83b urge, by spring forces thereof, the tension pulley 82 clockwise in FIG. 2 with a rotational centerline L4 taken as a center, and press the tension pulley 82 to the chain C.

When operating force from the shift operation member 61 is not applied to the inner cable 62b coupled to the coupling portion 73b1, the parallel link mechanism 73 occupies a basic portion or a maximum-speed position, which is shown by solid lines in FIG. 2 and FIG. 3, and the transmission sprocket 47 is selected as the operation sprocket. When the shift operation member 61 is operated, and operating force corresponding to a shift position is applied to the inner cable 62b, the parallel link mechanism 73 swings with the respective pins 81a and 81b taken as a swing center, and moves the guide pulley 72 along the respective transmission sprockets 41 to 47. At this time, both links 73a and 73b, both holders 76 and 77, both arms 86 and 87 and the tension pulley 82 swing together with the guide pulley 72, and move in the axial direction and the diameter direction toward a transmission sprocket of a shift destination, which serves as the operation sprocket. At the same time, the chain C moves in the axial direction toward the transmission sprocket of the shift destination. Meanwhile, when the parallel link mechanism 73 occupies a minimum-speed position shown by chain double-dashed lines in FIG. 2 and FIG. 3, the transmission sprocket 41 is selected as the operation sprocket.

Therefore, by the operation by means of the shift operation mechanism 60, the derailleur 70; or more specifically, both links 73a and 73b, both holders 76 and 77, the guide pulley 72, both arms 86 and 87 and the tension pulley 82; are movable within the swing range defined by a first limitation position as the maximum-speed position and a second limitation position as the minimum-speed position.

Thus it can be seen that when the crankshaft 12 is driven in the positive rotation direction A0 by the rider, or when the bicycle B goes ahead in a state where the crankshaft 12 rotates reversely or is stopped, by the operation of the shift operation member 61, the first and second holders 76 and 77, guide pulley 72, first and second arms 86 and 87 and tension pulley 82 of the derailleur 70 occupy the maximum-speed position, here, the seventh-speed position, as the above-described basic position shown by the solid lines in FIG. 2 to FIG. 4. The transmission sprocket 47 is selected as the operation sprocket in the sprocket group 40, and the chain C is wound between the drive sprocket 39 and the transmission sprocket 47 at positions shown by solid lines in FIG. 3 and FIG. 4. The crankshaft 12, rotating positively, rotationally drives the drive sprocket 39 through the one-way clutch 20 and the ball spline mechanism 30, and the drive sprocket 39 rotationally drives the transmission sprocket 47, the output shaft 15 and the drive sprocket 17 through the chain C in the gear ratio determined by both sprockets 39 and 47. Then, the drive sprocket 17 rotationally drives the driven sprocket 18 and the rear wheel Wr through the chain 19.

Also, it can be seen that when the shift operation member 61 is operated so as to select, as the operation sprocket, one of the lower-speed transmission sprockets 41 to 46, in order to switch the shift position from the maximum-speed position, the parallel link mechanism 73 of the derailleur 70 is operated by the inner cable 62b, and by the parallel link mechanism 73, the first and second holders 76 and 77, the guide pulley 72, the first and second arms 86 and 87 and the tension pulley 82 move to the left in the axial direction and to the outside in the diameter direction with respect to the rotational centerline L3, and occupy the lower-speed position, here, the first-speed position, shown by the chain double-dashed lines in FIG. 2 to FIG. 4. Then, the chain C moving to the left together with the guide pulley 72 and the tension pulley 82 moves the drive sprocket 39 to the left in the axial direction with respect to the main shaft 12a of the crankshaft 12, and the drive sprocket 39 occupies the position shown by the chain double-dashed lines in FIG. 3 and FIG. 4. At this time, the chain C is wound around the transmission sprocket 41, and the transmission sprocket 41 is coupled in a driven manner to the drive sprocket 39 with the chain C interposed therebetween.

Also, it can be seen that when the shift operation member 61 is operated so as to select one of the transmission sprockets 42 to 47 of high-speed positions from the first-speed position, the parallel link mechanism 73 of the derailleur 70 is operated by the inner cable 62b, and by the parallel link mechanism 73, the first and second holders 76 and 77, the guide pulley 72, the first and second arms 86 and 87 and the tension pulley 82 move to the right in the axial direction and the inside in the diameter direction with respect to the rotational centerline L3. The chain C moving to the right together with the guide pulley 72 and the tension pulley 82 moves the drive sprocket 39 to the right with respect to the main shaft 12a, and at the same time, the chain C is wound around the selected one of the transmission sprockets 42 to 47.

As described above, the chain C is shifted between the transmission sprockets 41 to 47 by the derailleur 70 operated in response to the shift operation by the shift operation mechanism 60, and the bicycle B runs in the gear ratio determined by the selected operation sprocket and the drive sprocket 39, between which the chain C is wound.

In the above-described transmission mechanism it can accordingly be seen that, in comparison with guide grooves each having a dead end halfway without opening to the axial direction, it becomes easy to form the guide grooves 36 by means of the machining, a choice of options for the processing means for the grooves is widened, and it is made possible to process the guide grooves 36 by lower-cost processing means, for example, the broaching. Therefore, processing cost of the inner slide member 31 is reduced, and eventually, cost of the above-described transmission mechanism is reduced. Moreover, the movements of the outer slide member 32 and the drive sprocket 39 in the axial direction beyond the movement range are regulated in such a manner that a part of the overlapping portion 26 having the inner slide member 31 coupled thereto, which is also a part of the clutch outer body 22, is disposed so as to be overlapping on the guide grooves 36 in the axial direction. Accordingly, the movement of the drive sprocket 39 in the axial direction can be regulated by means of a simple structure using the overlapping portion 26 for the guide grooves 36 in which both ends 36a and 36b open.

Also accordingly, by means of the simple structure of the invention using the overlapping portion 26, the regulation of the movement of the drive sprocket 39 in the axial direction and the prevention of the balls 33 from falling off can be achieved.

The clutch outer body 22 has the main body portion 25 in which the ratchet teeth 27 having the claws 23 engaged therewith are formed on the inner peripheral surface, the maximum inner diameter d1 of the main body portion 25 is equal to or less than the minimum inner diameter d2 of the overlapping portion 26, and the ratchet teeth 27 are formed in such a manner that the grooves 28 extended parallel to the axial direction and having both ends thereof in the axial direction open to the axial direction are formed on the inner peripheral surface of the main body portion 25. In comparison with the known case of forming the ratchet teeth 27 by the grooves 28 each having a dead end halfway without opening to the axial direction, it becomes easy to form the ratchet teeth 27 by means of the machining. Thus, a choice of options for the processing means for the ratchet teeth 27 is widened, and it is made possible to process the ratchet teeth 27 by lower-cost processing means, for example, the broaching. As a result, in the clutch outer body 22 having the overlapping portion 26, it becomes easy to process the ratchet teeth 27 with which the claws 23 are engaged. Therefore, processing cost of the clutch outer body 22 is reduced, and eventually, the cost of the above-described transmission mechanism is reduced.

It will be seen that the overlapping portion 26 and the overlapping portion 35 disposed inside in the diameter direction from the overlapping portion 26 are coupled to each other by the coupling pins 100. Each coupling pin 100 has the clutch-side insertion portion 101 inserted into the insertion hole 120 formed in the overlapping portion 26, and the slide-side insertion portion 102 inserted into the slit 140. In the portion closer to the insertion portion 102 than to the insertion portion 101 in the coupling pin 100, the step portion 103 incapable of being inserted into the insertion hole 120 is formed. Thus, the clutch outer body 22 and the inner slide member 31 are coupled to each other by the coupling pins 100 each having the insertion portion 101 and insertion portion 102, which are inserted into the insertion hole 120 and the slit 140, the insertion hole 120 and the slit 140 being formed in the overlapping portion 26 and the overlapping portion 35, respectively. Accordingly, the clutch outer body 22 and the inner slide member 31 are coupled to each other by means of a simple structure. Moreover, the step portion 103 is formed in each coupling pin 100. Accordingly, when centrifugal force generated by the rotations of the clutch outer body 22 and the inner slide member 31 is applied to the coupling pin 100, the step portion 103 abuts on the overlapping portion 26, and the coupling pin 100 is thus prevented from moving outside in the diameter direction. As a result, the coupling pin 100 is prevented from falling off from the inner slide member 31 and the clutch outer body 22 owing to the rotations of the clutch outer body 22 and the inner slide member 31 by means of a simple structure.

The overlapping portion 26 and the overlapping portion 35 disposed inside in the diameter direction from the overlapping portion 26 are coupled to each other by the coupling pins 100. Each coupling pin 100 has the insertion portion 102 inserted into the slit 140 formed in the overlapping portion 35. Each slit 140 is formed on the end of the overlapping portion 35 in the axial direction and opens to the axial direction. Each coupling pin 100 has the pair of contact planes 102a individually brought into surface contact with the pair of contact planes 140a opposed to each other in the circumferential direction in the wall surface defining the slit 140. Each coupling pin 100 is inserted into the slit 140 from the axial direction. In such a way, torque transmission between the coupling pin 100 and the inner slide member 31 is performed on the portions where the contact planes 102a and the contact planes 140a are brought into surface contact with each other. Accordingly, a contact pressure of each contact portion of both of the contact planes is reduced, and in addition, the surface contact is made by the planes. In such a way, by means of a simple structure, the clutch outer body 22 and the inner slide member 31 are coupled to each other, and each coupling pin 100 is prevented from rotating. Therefore, a relative rotation of the coupling pin 100 to the inner slide member 31 and the clutch outer body 22 is prevented, abrasion owing to the relative rotation is prevented, and a gap owing to the abrasion is prevented or restricted from being formed between the coupling pin 100 and the inner slide member 31 and the clutch outer body 22. Accordingly, performance of integral rotation of the clutch outer body 22 and the inner slide member 31 can be maintained for a long period of time. Moreover, the coupling pins 100 are inserted into the inner slide member 31 from the axial direction, and accordingly, work of coupling the clutch outer body 22 and the inner slide member 31 to each other by the coupling pins 100 is facilitated, and workability in the coupling work for the clutch outer body 22 and the inner slide member 31 is thus enhanced.

It will also be seen that in the transmission T, the inner slide member 31 of the ball spline mechanism 30 has the guide surface S1 for guiding the outer slide member 32 so as to be movable in the axial direction, and on the outer slide member 32, the dust cover 150 for covering the outsides in the diameter direction of the guide surfaces S1 and S2 irrespective of the position of the drive sprocket 39 in the axial direction is provided. Thus, the guide surfaces S1 and S2 of the guide grooves 36 and 37 of the ball spline mechanism 30 are covered with the dust cover 150 irrespective of the position of the drive sprocket 39 moving in the axial direction. Thus, foreign objects, such as abrasion powder generated by the jamming of the respective sprockets 39 and 41 to 47 and the chain C, and by the contact of the chain C and the guide pulley 72 and tension pulley 82 of the derailleur 70, are prevented or restricted from entering onto the guide surfaces S1 and S2 and attaching onto the guide surfaces S1 and S2. Accordingly, when the drive sprocket 39 moving integrally with the outer slide member 32 moves in the axial direction by the movement of the chain C in the axial direction, the movement thereof in the axial direction is prevented or restricted from being inhibited by the foreign object attached onto the guide surfaces S1 and S2, smoothness of the movement of the drive sprocket 39 in the axial direction is enhanced, and eventually, smoothness of transmission switching of the transmission T is enhanced. In addition, a maintenance cycle can be extended.

By forming he dust cover 150 into a tubular shape covering the overall periphery of the inner slide member 31, and having the tapered portions 151c and 152c tapered toward the ends 151e and 152e in the axial direction, the dust cover 150 covers the overall periphery of the inner slide member 31, and accordingly, foreign objects are prevented or restricted from entering onto the guide surfaces S1 and S2 in the entire region of the inner slide member 31 in the circumferential direction. Further, the areas of the openings 153 and 154 of the dust cover 150 in the axial direction are reduced by the tapered portions 151c and 152c. Accordingly, when the dust cover 150 moves in the axial direction together with the outer slide member 32, the foreign object is restricted from entering from the openings 153 and 154. Therefore, foreign objects are further restricted from entering onto the guide surfaces S1 and S2, and the smoothness of the movement of the drive sprocket 39 in the axial direction, and eventually, the smoothness of the transmission switching of the transmission T, are further enhanced.

The first and second covers 151 and 152 constituting the dust cover 150 are the members separate from the outer slide member 32, and on the inner peripheral surfaces of the first and second covers 151 and 152, the convex portions 151d and 152d engaged with the concave portions 32a and 32b formed on the outer peripheral surface of the outer slide member 32 are formed. The convex portions 151d and 152d and the concave portions 32a and 32b formed on the outer surface of the outer slide member 32 are engaged with each other, and the first and second covers 151 and 152 are thus attached onto the outer slide member 32. Accordingly, it is facilitated to attach the first and second covers 151 and 152. In addition, the first and second covers 151 and 152 are attached onto the outer slide member 32, and accordingly, it is not necessary to use attachment members separately. Therefore, the cost of the transmission T can be reduced.

It will also be noted that the first and second covers 151 and 152 are located below the guide pulley 72. The guide pulley 72 is disposed at the position where the shortest distance from the rotational centerline L1 of the crankshaft 12 to the guide pulley 72 is smaller than the outer diameter d3 of the drive sprocket 39. In such a way, when the chain C is shifted, the abrasion powder dropping from the vicinity of the guide pulley 72, where the amount of the abrasion powder generated is relatively large owing to the contact thereof with the chain C, is prevented or restricted from entering onto the guide surfaces S1 and S2 of the ball spline mechanism 30 by the dust cover 150. Accordingly, even in the case where the guide pulley 72 is disposed at the position where the shortest distance from the rotational centerline L1 of the crankshaft 12 to the guide pulley 72 is smaller than the outer diameter d3 of the drive sprocket 39, and the drive sprocket 39 and the guide pulley 72 are arranged adjacent to each other, the abrasion powder is effectively prevented or restricted from entering on the guide surfaces S1 and S2. As a result, the drive sprocket 39 and the guide pulley 72 can be arranged adjacent to each other while ensuring the smoothness of the movement of the drive sprocket 39 in the axial direction. Accordingly, the transmission T can be downsized. Moreover, in the entirety of the swing range, the substantial entirety of the guide pulley 72, which includes at least the wound portion C1 of the chain C in the guide pulley 72, is located within the circle of which radius is the outer diameter d3 of the drive sprocket 39 with the rotational centerline L1 taken as the center. In such a way, the transmission T can be further downsized.

It will further be appreciated that modified embodiments may be had with regard to the above-described embodiment. For example, the outer-side engagement portions may be composed of the convex portions, and the cover-side engagement portions may be composed of the concave portions. Moreover, the dust cover 150 may be molded integrally with the outer slide member 32. Furthermore, the tapered portions 151c and 152c may be formed closer to the base portions 151a and 152a than to the ends 151e and 152e without including the ends 151e and 152e.

The dust cover 150 may be one having covering portions each having at least a width in the circumferential direction, which is sufficient for covering each of the guide surfaces S1 and S2, correspondingly to the positions of the guide surfaces S1 and S2 in the circumferential direction. At this time, the covering portions of which number is equal to that of the guide grooves 36 and 37 are provided at an interval in the circumferential direction.

The transmission case 90 may be a transmission case 90 having an opening open to the outside without forming the hermetically sealed inside space 93.

The slide mechanism may be a spline formed of plural protrusions extended parallel to the axial direction and plural grooves extended parallel to the axial direction, to which the protrusions are fitted, without including the coupling elements. The coupling pins or the coupling members may be molded integrally with the clutch outer body 22 or the inner slide member 31.

While a working example of the present invention has been described above, the present invention is not limited to the working example described above, but various design alterations may be carried out without departing from the spirit and scope of the present invention as set forth in the claims.

What is claimed is:

1. A transmission mechanism for a manually powered vehicle, said transmission comprising:
   a one-way clutch and a crankshaft operatively coupled to the one-way clutch,
      the one-way clutch comprising a clutch outer body, a clutch inner body which is integrally rotatable with the crankshaft, and a clutch element interposed between the clutch inner body and the clutch outer body, and
   a slide mechanism comprising an outer slide member coupled to an inner slide member so as to be integrally rotatable with the inner slide member and movable in an axial direction with respect to the inner slide member which, in turn, is integrally rotatable with the clutch outer body, whereby the one-way clutch only transmits torque, when the crankshaft rotates positively, to a second rotation member through the slide mechanism,
   wherein the inner slide member has an outer peripheral surface with a guide groove formed therein and extending parallel to an axial direction for guiding the outer slide member to be movable in the axial direction, the guide groove being formed to open to the axial direction at both ends thereof,
   the clutch outer body and the inner slide member being formed as separate members; and being operatively joined with each other by a coupling pin;
   wherein the clutch outer body has a clutch-side overlapping portion and the inner slide member has a slide-side overlapping portion, the clutch-side overlapping portion and the slide-side overlapping portion overlapping each other in the axial direction and configured such that a gap is formed therebetween in the area of the groove,
   wherein the clutch-side overlapping portion of the clutch outer body overlaps the guide groove in the axial direction, and restricts the outer slide member from moving axially, relative to the inner slide member, beyond a predetermined movement range.

2. The transmission mechanism according to claim 1, wherein:
   the slide mechanism includes a coupling element for coupling the inner slide member and the outer slide member, whereby the outer slide member is integrally rotatable with the inner slide member and is movable in the axial direction with respect to the inner slide member,
   the coupling element being disposed between the inner slide member and the outer slide member, housed in the guide groove, and guided to be movable in the axial direction, and
   wherein the clutch-side overlapping portion abuts on the coupling element and regulates a movement of the coupling element in the axial direction, thereby restricting the outer slide member from moving in the axial direction beyond the predetermined movement range.

3. The transmission mechanism according to claim 1,
   wherein the outer slide member has a main body portion in which an engagement portion is formed for engaging the clutch element,
   wherein a maximum inner diameter of the main body portion is equal to or less than a minimum inner diameter of the clutch-side overlapping portion, and
   wherein the engagement portion is formed on an inner peripheral surface of the outer slide member as an inside groove extended parallel to the axial direction and having both ends thereof in the axial direction open to the axial direction.

4. The transmission mechanism according to claim 2,
   wherein the outer slide member has a main body portion in which an engagement portion is provided for engaging the clutch element,
   wherein a maximum inner diameter of the main body portion is equal to or less than a minimum inner diameter of the clutch-side overlapping portion, and
   wherein the engagement portion is formed on an inner peripheral surface of the outer slide member as an inside groove extended parallel to the axial direction and having both ends thereof in the axial direction open to the axial direction.

5. The transmission mechanism according to claim 1,
   wherein the slide-side overlapping portion is disposed diametrically inside the clutch-side overlapping portion and coupled to the clutch-side overlapping portion by the coupling pin,
   wherein the coupling pin has a clutch-side insertion portion inserted into a clutch-side insertion space formed in the clutch-side overlapping portion, and
   wherein the coupling pin has a slide-side insertion portion inserted into a slide-side insertion space formed in the slide-side overlapping portion, and the coupling pin comprises a step portion located closer to the slide-side insertion portion than to the clutch-side insertion portion thereof,
   the step portion being incapable of being inserted into a clutch-side insertion space.

6. The transmission mechanism according to claim 2,
   wherein the slide-side overlapping portion is disposed diametrically inside the clutch-side overlapping portion and coupled to the clutch-side overlapping portion by the coupling pin,
   wherein the coupling pin has a clutch-side insertion portion inserted into a clutch-side insertion space formed in the clutch-side overlapping portion, and
   wherein the coupling pin has a slide-side insertion portion inserted into a slide-side insertion space formed in the slide-side overlapping portion, and the coupling pin comprises a step portion located closer to the slide-side insertion portion than to the clutch-side insertion portion thereof the step portion being incapable of being inserted into a clutch-side insertion space.

7. The transmission mechanism according to claim 3, wherein the slide-side overlapping portion is disposed diametrically inside the clutch-side overlapping portion and coupled to the clutch-side overlapping portion by the coupling pin, wherein the coupling pin has a clutch-side insertion portion inserted into a clutch-side insertion space formed in the clutch-side overlapping portion, and wherein the coupling pin has a slide-side insertion portion inserted into a slide-side insertion space formed in the slide-side overlapping portion, and the coupling pin comprises a step portion located closer to the slide-side insertion portion than to the clutch-side insertion portion thereof, the step portion being incapable of being inserted into a clutch-side insertion space.

8. The transmission mechanism according to claim 1, wherein the slide-side overlapping portion is disposed diametrically inside of the clutch-side overlapping portion and is coupled to the clutch-side overlapping portion by the coupling pin, wherein the coupling pin has a slide-side insertion portion inserted into a slide-side insertion space formed in the slide-side overlapping portion of the inner slide member, the slide-side insertion space being composed of a slit formed on an end of the inner slide member in the axial direction and opening to the axial direction, wherein the coupling pin has a pair of pin-side contact planes individually brought into surface contact with a pair of slide-side contact planes opposed to each other in a circumferential direction in a wall surface defining the slit, and wherein the coupling pin is inserted into the slit from the axial direction.

9. The transmission mechanism according to claim 2, wherein the slide-side overlapping portion is disposed diametrically inside of the clutch-side overlapping portion and is coupled to the clutch-side overlapping portion by the coupling pin, wherein the coupling pin has a slide-side insertion portion inserted into a slide-side insertion space formed in the slide-side overlapping portion of the inner slide member, the slide-side insertion space being composed of a slit formed on an end of the inner slide member in the axial direction and opening to the axial direction, wherein the coupling pin has a pair of pin-side contact planes individually brought into surface contact with a pair of slide-side contact planes opposed to each other in a circumferential direction in a wall surface defining the slit, and wherein the coupling pin is inserted into the slit from the axial direction.

10. The transmission mechanism according to claim 3, wherein the slide-side overlapping portion is disposed diametrically inside of the clutch-side overlapping portion and is coupled to the clutch-side overlapping portion by the coupling pin, wherein the coupling pin has a slide-side insertion portion inserted into a slide-side insertion space formed in the slide-side overlapping portion of the inner slide member, the slide-side insertion space being composed of a slit formed on an end of the inner slide member in the axial direction and opening to the axial direction, wherein the coupling pin has a pair of pin-side contact planes individually brought into surface contact with a pair of slide-side contact planes opposed to each other in a circumferential direction in a wall surface defining the slit, and wherein the coupling pin is inserted into the slit from the axial direction.

11. A bicycle, including a frame and a transmission mechanism operatively attached to the frame, said transmission mechanism comprising:

a crankshaft coupled to a one-way clutch, the one way clutch having a clutch outer body coupled to an clutch inner body, the clutch inner body integrally rotatable with the crankshaft, and a clutch element interposed between the clutch inner body and the clutch outer body, a slide mechanism having an outer slide member coupled to an inner slide member so as to be integrally rotatable with the inner slide member and movable in an axial direction with respect to the inner slide member which is integrally rotatable with the clutch outer body, whereby the one-way clutch only transmits torque, when the crankshaft rotates positively, to a second rotation member through the slide mechanism, and a guide groove for guiding the outer slide member to be movable in the axial direction, the guide groove being formed parallel to an axial direction on an outer peripheral surface of the inner slide member, the guide groove being formed to open to the axial direction at both ends in the axial direction, the clutch outer body and the inner slide member being composed of members separate from each other, the clutch outer body and the inner slide member being operatively joined with each other by a coupling pin, the clutch outer body having a clutch-side overlapping portion and the inner slide member having a slide-side overlapping portion, the clutch-side overlapping portion and the slide-side overlapping portion being overlapping on each other in the axial direction and configured such that a gap is formed therebetween in the area of the groove, the clutch outer body and the inner slide member being coupled to each other to be integrally rotatable with each other in the clutch-side overlapping portion and the slide-side overlapping portion, and the clutch-side overlapping portion being overlapping on the guide groove in the axial direction, and restricting the outer slide member from moving in the axial direction beyond a predetermined range of movement with respect to the inner slide member.

12. The bicycle of claim 11, wherein the slide mechanism includes a coupling element for coupling the inner slide member and the outer slide member, whereby the outer slide member is integrally rotatable with the inner slide member and is movable in the axial direction with respect to the inner slide member, the coupling element being disposed between the inner slide member and the outer slide member, housed in the guide groove, and guided to be movable in the axial direction, and wherein the clutch-side overlapping portion abuts on the coupling element and regulates a movement of the coupling element in the axial direction, thereby restricting the outer slide member from moving in the axial direction beyond the predetermined range of movement.

13. The transmission mechanism according to claim 11,
wherein the outer slide member has a main body portion in which an engagement portion is formed for engaging the clutch element,
wherein a maximum inner diameter of the main body portion is equal to or less than a minimum inner diameter of the clutch-side overlapping portion, and
wherein the engagement portion is formed on an inner peripheral surface of the outer slide member as an inside groove extended parallel to the axial direction and having both ends thereof in the axial direction open to the axial direction.

14. The transmission mechanism according to claim 11,
wherein the slide-side overlapping portion is disposed diametrically inside the clutch-side overlapping portion and coupled to the clutch-side overlapping portion by the coupling pin,
wherein the coupling pin has a clutch-side insertion portion inserted into a clutch-side insertion space formed in the clutch-side overlapping portion, and
wherein the coupling pin has a slide-side insertion portion inserted into a slide-side insertion space formed in the slide-side overlapping portion,
and the coupling pin comprises a step portion located closer to the slide-side insertion portion than to the clutch-side insertion portion thereof,
the step portion being incapable of being inserted into a clutch-side insertion space.

15. The bicycle of claim 11,
wherein the slide-side overlapping portion is disposed diametrically inside of the clutch-side overlapping portion and is coupled to the clutch-side overlapping portion by the coupling pin,
wherein the coupling pin has a slide-side insertion portion inserted into a slide-side insertion space formed in the slide-side overlapping portion of the inner slide member,
the slide-side insertion space being composed of a slit formed on an end of the inner slide member in the axial direction and opening to the axial direction,
wherein the coupling pin has a pair of pin-side contact planes individually brought into surface contact with a pair of slide-side contact planes opposed to each other in a circumferential direction in a wall surface defining the slit, and
wherein the coupling pin is inserted into the slit from the axial direction.

16. A transmission mechanism for a bicycle having a manually operated crankshaft, said transmission mechanism comprising:
a clutch inner body integrally rotatable with the crankshaft;
a clutch outer body rotatable with said clutch inner body;
a clutch element interposed between the clutch inner body and the clutch outer body;
an inner slide member formed separately from the clutch outer body, said inner slide member having an open-ended guide groove formed therein extending parallel to an axial direction of the crankshaft;
an outer slide member coupled to the inner slide member, and integrally rotatable therewith; said outer slide member being movable in an axial direction with respect to the inner slide member in said guide groove of the inner slide member; and
a coupling pin for operatively connecting the clutch outer body and the inner slide member with each other;
wherein:
the clutch outer body comprises a clutch-side overlapping portion, and the inner slide member comprises a slide-side overlapping portion, wherein the clutch-side overlapping portion and the slide-side overlapping portion overlap each other in the axial direction, and
wherein the clutch-side overlapping portion of the clutch outer body overlaps the guide groove in the axial direction, and restricts axial movement of the outer slide member beyond a predetermined movement range.

17. A transmission mechanism for a bicycle according to claim 16, further comprising
a coupling element for coupling the inner slide member and the outer slide member, whereby the outer slide member is integrally rotatable with the inner slide member and is movable in the axial direction with respect to the inner slide member,
the coupling element being disposed between the inner slide member and the outer slide member, housed in the guide groove; and
wherein the clutch-side overlapping portion abuts on the coupling element and regulates a movement of the coupling element in the axial direction, thereby restricting the outer slide member from moving in the axial direction beyond the predetermined movement range.

18. A transmission mechanism for a bicycle according to claim 16,
wherein the outer slide member has a main body portion in which an engagement portion is formed for engaging the clutch element,
wherein a maximum inner diameter of the main body portion is less than or equal to a minimum inner diameter of the clutch-side overlapping portion, and
wherein the engagement portion is formed on an inner peripheral surface of the outer slide member as an inside groove extended parallel to the axial direction and having both ends thereof in the axial direction open to the axial direction.

19. A transmission mechanism for a bicycle according to claim 16, wherein the slide-side overlapping portion is disposed diametrically inside the clutch-side overlapping portion and coupled to the clutch-side overlapping portion by the coupling pin,
wherein the coupling pin has a clutch-side insertion portion inserted into a clutch-side insertion space formed in the clutch-side overlapping portion, and
wherein the coupling pin has a slide-side insertion portion inserted into a slide-side insertion space formed in the slide-side overlapping portion, and the coupling pin comprises a step portion located closer to the slide-side insertion portion than to the clutch-side insertion portion thereof, the step portion being incapable of being inserted into a clutch-side insertion space.

20. A transmission mechanism for a bicycle according to claim 17,
wherein the slide-side overlapping portion is disposed diametrically inside of the clutch-side overlapping portion and is coupled to the clutch-side overlapping portion by the coupling pin,
wherein the coupling pin has a slide-side insertion portion inserted into a slide-side insertion space formed in the slide-side overlapping portion of the inner slide member,
the slide-side insertion space being composed of a slit formed on an end of the inner slide member in the axial direction and opening to the axial direction,
wherein the coupling pin has a pair of pin-side contact planes individually brought into surface contact with a pair of slide-side contact planes opposed to each other in a circumferential direction in a wall surface defining the slit, and wherein the coupling pin is inserted into the slit from the axial direction.

* * * * *